(12) United States Patent
Thompson et al.

(10) Patent No.: US 7,605,714 B2
(45) Date of Patent: Oct. 20, 2009

(54) SYSTEM AND METHOD FOR COMMAND AND CONTROL OF WIRELESS DEVICES USING A WEARABLE DEVICE

(75) Inventors: R. Donald Thompson, Sammamish, WA (US); Eric G. Lang, Yarrow Point, WA (US); Russell I. Sanchez, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 11/128,898

(22) Filed: May 13, 2005

(65) Prior Publication Data

US 2006/0255963 A1   Nov. 16, 2006

(51) Int. Cl.
*G08C 19/00* (2006.01)
*G05B 19/02* (2006.01)
*H04Q 5/22* (2006.01)

(52) U.S. Cl. ............................ 340/825.69; 340/825.72; 340/825.24; 340/10.1; 340/10.2; 340/10.3

(58) Field of Classification Search ............ 340/825.69, 340/825.72, 825.24, 10.1; 700/65–66; 341/176
See application file for complete search history.

(56) References Cited

U.S. PATENT DOCUMENTS

| | | | |
|---|---|---|---|
| 6,791,467 B1* | 9/2004 | Ben-Ze'ev | 340/825.69 |
| 6,792,323 B2* | 9/2004 | Krzyzanowski et al. | 700/90 |
| 6,914,551 B2* | 7/2005 | Vidal | 341/176 |
| 7,064,675 B2* | 6/2006 | Zigmond et al. | 340/825.72 |
| 7,158,047 B2* | 1/2007 | Ushida | 340/825.72 |
| 7,345,593 B2* | 3/2008 | Park et al. | 340/825.72 |
| 7,363,028 B2* | 4/2008 | de Clerq et al. | 455/414.1 |

* cited by examiner

*Primary Examiner*—Brian A Zimmerman
*Assistant Examiner*—Nam V Nguyen
(74) *Attorney, Agent, or Firm*—Merchant & Gould; Ryan T. Grace

(57) ABSTRACT

A wearable electronic device is configured to control and command a variety of wireless devices within its proximity. The wearable device dynamically generates a user interface corresponding to the services of a particular wireless device. Through the user interface, the wireless device surface content to a user and allows a user select interactions with the wireless devices using the wearable device.

20 Claims, 6 Drawing Sheets

SYSTEM AND METHOD FOR COMMAND AND CONTROL OF WIRELESS DEVICES USING A WEARABLE DEVICE

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and include a user interface to help the user access the features associated with the device. For example, some mobile devices include a display unit that displays graphical data to support email, instant messaging, web browsing, and other non-voice features. Using their mobile devices, users access the Internet, send and receive email, participate in instant messaging, and perform other operations. Humans are increasingly interacting with traditional computational systems, such as desktop PCs, laptops, and Tablet PCs, and the like. Also becoming more prevalent are the next generation technologies, such as smart phones, watches and other wearable devices, as well as smart environments (cars, buildings, rooms, shops, etc.), which enhance the computational and interactive environment to the user. Interoperation between these computational, next-generation, and environmental devices has however been virtually non-existent. Any interoperation between these devices has been cumbersome, often requiring a direct connection between devices for synchronization and other purposes.

SUMMARY OF THE INVENTION

Embodiments of the present invention are related to a wearable device, such as a wristwatch, that is capable of command and control of other wireless devices within its environment. The present invention, in one exemplary form-factor, provides for a smart wristwatch. The wristwatch form-factor is well-suited to wearable computing applications due to its "glance-able" surface, quick and natural access, easy interaction, common social acceptance across cultures, and other aspects. As more and more daily use devices are made "smart" by including wireless transmission capabilities, the greater the advantage to providing centralized control of these devices. Additionally, many of these devices are not realistically able to expose a local user interface for reasons of size, cost, usability, power, physical access, environmental conditions, and the like. As one example, a heart rate sensor chest strap relies on a secondary device for display. The display comes in the form of a wired monitor, or possibly a wireless monitor that is specially made for communication with the heart rate sensor. To display the heart rate information, the heart rate sensor simply emits the information it senses according to some predefined scheme that is understood by the monitor. The present invention removes the requirement of the specialized monitor by providing a dynamic display and interaction (command and control) for such devices, in addition to actual data processing services (logging, training feedback, statistics, etc.). Therefore, the heart rate information may be displayed by a device that the doctor is already wearing due to the dynamic display capabilities of the wearable device of the present invention. In another example, the same wearable device may also provide a dynamic display for surfacing caller ID information from a cell phone in a bag or pocket of the user. In still other examples, the watch may be used to control a television, a light switch, a door lock, a portable music device, a car ignition, and the like. Additionally, the wearable device may provide a dynamic user interface (UI) that surfaces information from an array of other computational devices, such as cell phones, PDAs, laptops, desktops, media players, and host of other devices that may have their own, but more inconvenient, display capabilities.

In accordance with one aspect of the present invention, a method is provided for command and control of a wireless device using a wearable device. The method includes discovering the wireless device and recognizing the wireless device such that functionality of the wireless device is made available through the wearable device. The wearable device provides an adaptive user interface that is dynamically generated according to the wireless device recognized such that interaction with the wearable device is available for a variety of wireless devices.

In accordance with another aspect of the present invention, an apparatus for command and control of a wireless device is provided. The apparatus includes a data store, a communication connection configured to receive content from the wireless device and provide control of the wireless device, a display, an adaptive user interface that includes a selector, and an electronic system. The electronic system is arranged to interact with the adaptive user interface, the data store, the communication connection, and the display. The electronic system is configured to discover the wireless device, recognize the wireless device such that functionality of the wireless device is made available through the adaptive user interface, and dynamically generate a display using the adaptive user interface on the wearable device according to the wireless device recognized, such that interaction with a variety of wireless devices is available through the adaptive user interface.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
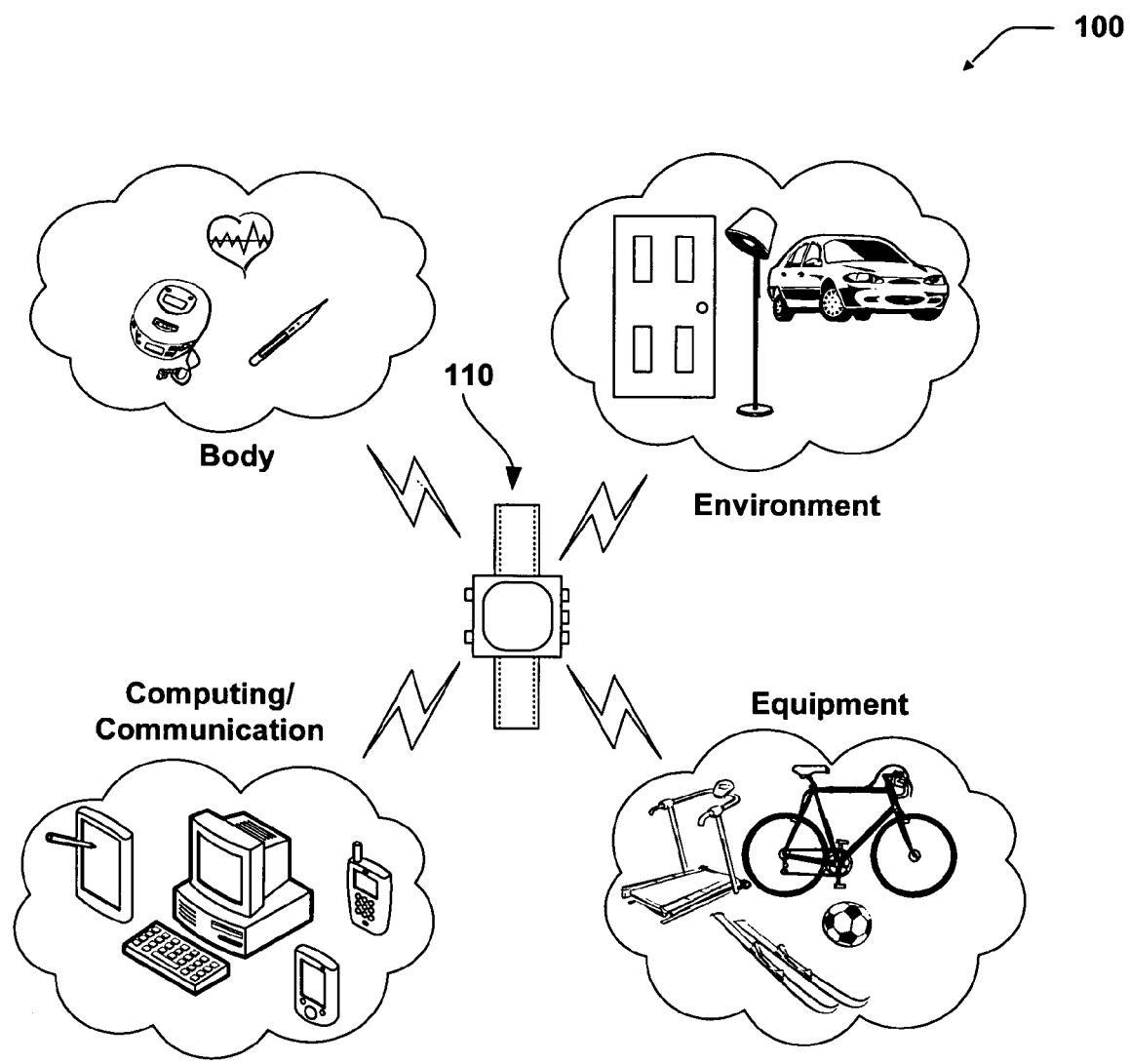
FIG. 1 illustrates a functional block diagram for an exemplary electronic device usable for command and control of wireless devices in accordance with the present invention.

FIG. 1 illustrates an example operating environment for the present invention. As illustrated, operating environment 100 includes wearable device 110 that is responsible for obtaining content from wireless devices and presenting the content to a user. The term "wearable" device corresponds to any electronic device that may be placed in more readily viewable and controllable position with respect to the user than the wireless device to which it is communicating. For example, the wireless device may be a mobile phone in a pocket while the wearable device is a watch on the user's wrist. In another example, the wireless device may be a switch located away from the user on the wall, while the wearable device is a PDA device strapped to the user's belt. For two devices in communication, the wearable device is the device that is more accessible to the user for control. The term "wireless device" refers to any electronic device that is capable of wireless communication. Various devices not normally associated with communicating data are being turned into "smart" devices by making them capable of wireless communication, and these devices are also included in reference to the term. The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

As shown in FIG. 1, the content may have number of different sources from various wireless devices within the environment of the wearable device 110. For example, a source of content for the wearable device may be wireless devices having to do with an individual's person, or monitoring of bodily functions. For example, a heart rate monitor may be strapped to an individual's chest. In this case, wearable device 110 provides a display of the content received wirelessly from the heart rate monitor. Wireless devices associated with an individual may also include personal CD players, media players, thermometers, pacemakers, clothing medical devices, and the like.

Another source of content for the wearable device may be wireless devices associated with the environment, such as a door or light switch. Other environmental devices may also include cars, thermostats, television sets, stereo equipment, and the like.

A more common and readily available source of data may include other computing or communication equipment that a user may have in proximity to their person. For example, wearable device 110 may be configured to illustrate caller ID information from a mobile phone located in the user's pocket or bag. Surfacing the caller ID information using the wearable device allows the user to obtain the information at a glance, rather than digging for the mobile phone. Other sources of content may include laptop computers, desktop computers, phones, mobile phones, PDAs, and the like.

Still a further source of content may be general purpose equipment that has been made smart through the addition of wireless communication functionality. For example, wearable device 110 may surface data provided from a bicycle in the form of miles traveled, or from a treadmill in calories burned. A wireless communication sensor may even be place in association with a ball to show velocity of motion or other statistics.

Operating environment 100 is provided to show the variety of devices that may be provided with wireless communication capabilities. The examples shown are not meant to be exhaustive set of devices that may be used in relation to the wearable device of the present invention. For example, another source of content may include shipped goods having an associated radio frequency identifier. With the present invention, a user of the wearable device may be presented with a dynamically created user interface that illustrates information about the goods (e.g., quantity, date shipped, etc.). The user may also be able to press a button on the wearable device that checks the goods into a warehouse or store. Accordingly, the wearable device provides the user with immediate feedback regarding the goods, and the ability to dynamically interact with the content provided.

Figure 2:
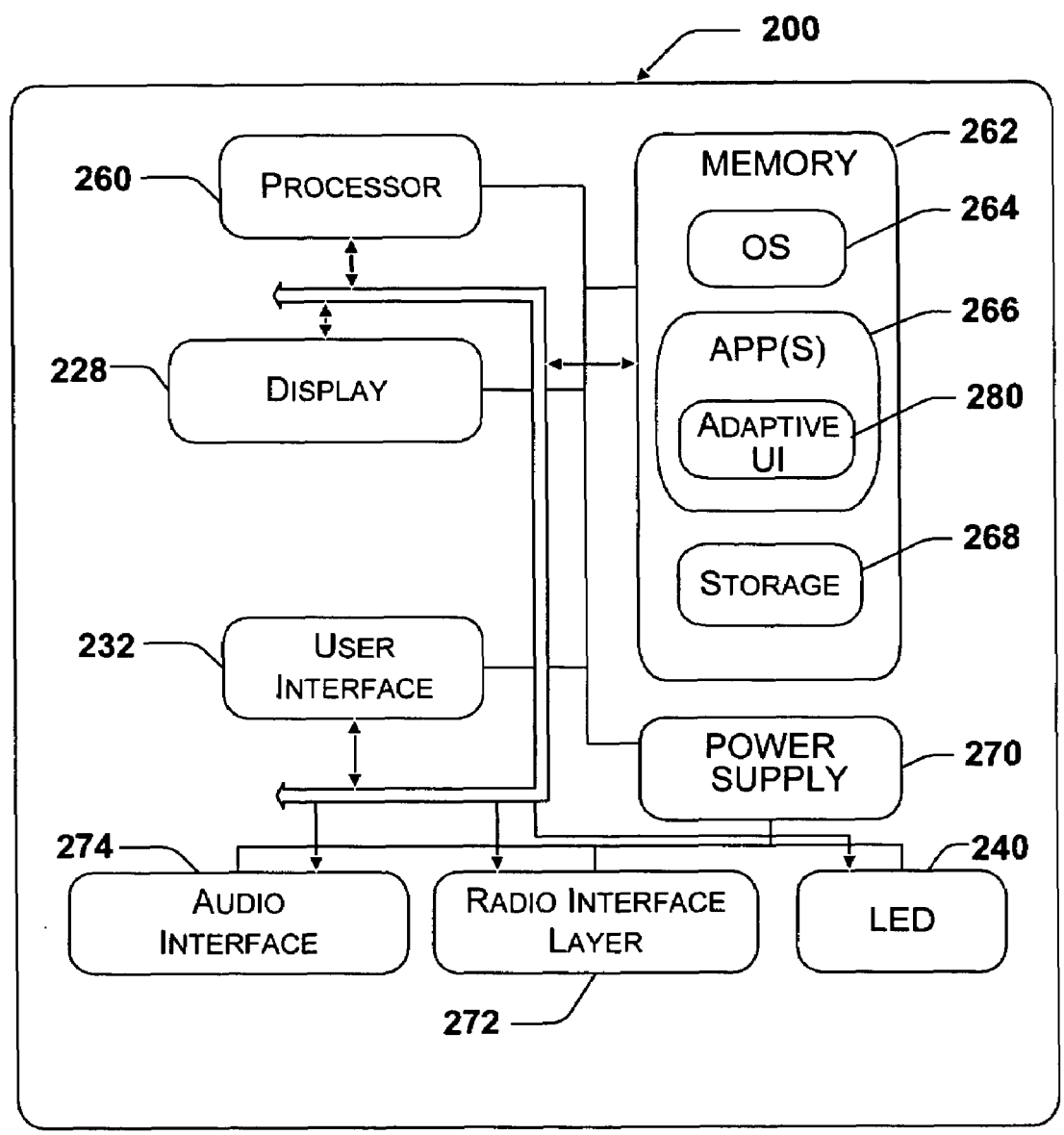
FIG. 2 illustrates an exemplary operating environment in accordance with the present invention.

FIG. 2 is a schematic diagram illustrating functional components of an illustrative electronic device that may be used as a wearable command and control device, in accordance with aspects of the invention. Electronic device 200 includes processor 260, memory 262, display 228, and user interface 232. Memory 262 generally includes both volatile memory (e.g., RAM) and non-volatile memory (e.g., ROM, Flash Memory, or the like). Electronic device 200 may include an operating system 264, such as the Windows CE operating system from Microsoft Corporation or another operating system, which is resident in memory 262 and executes on processor 260. User interface 232 may be a series of push buttons, a scroll wheel, a numeric dialing pad (such as on a typical telephone), or another type of user interface means. Display 228 may be a liquid crystal display, or any other type of display commonly used in electronic devices. In one example, display 228 may be touch-sensitive that would act as an input device.

One or more application programs 266 are loaded into memory 262 and run on the device. Examples of application programs include sports programs, calendar programs, movie programs, time programs, and so forth. Electronic device 200 also includes non-volatile storage 268 that is located within memory 262. Non-volatile storage 268 may be used to store persistent information which should not be lost if electronic device 200 is powered down. Applications 266 may use and store information in storage 268, such as user interface data, and the like. Applications 266 may further include an adaptive user interface application that provides a dynamically generated user interface in accordance with the present invention.

Electronic device 200 includes power supply 270, which may be implemented as one or more batteries. Power supply 270 might further include an external power source, such as an AC adapter or a powered docking cradle that supplements or recharges the batteries.

Electronic device 200 is also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived content. Electronic device 200 can control each alert mechanism separately (e.g., audio, vibration, as well as visual cues).

Electronic device 200 also includes a communication connection, such as radio interface layer 272, which performs the function of receiving and/or transmitting radio frequency communications. Radio interface layer 272 facilitates wireless connectivity for electronic device 200. Transmissions to and from radio interface layer 272 are conducted under control of the operating system 264. In other words, communications received by radio interface layer 272 may be disseminated to application programs 266.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

In one example of the present invention, electronic device 200 is a mobile electronic device such as a watch device that includes a wireless interface. An exemplary watch device is shown in FIG. 3.

Illustrative Wearable Device

Figure 3:
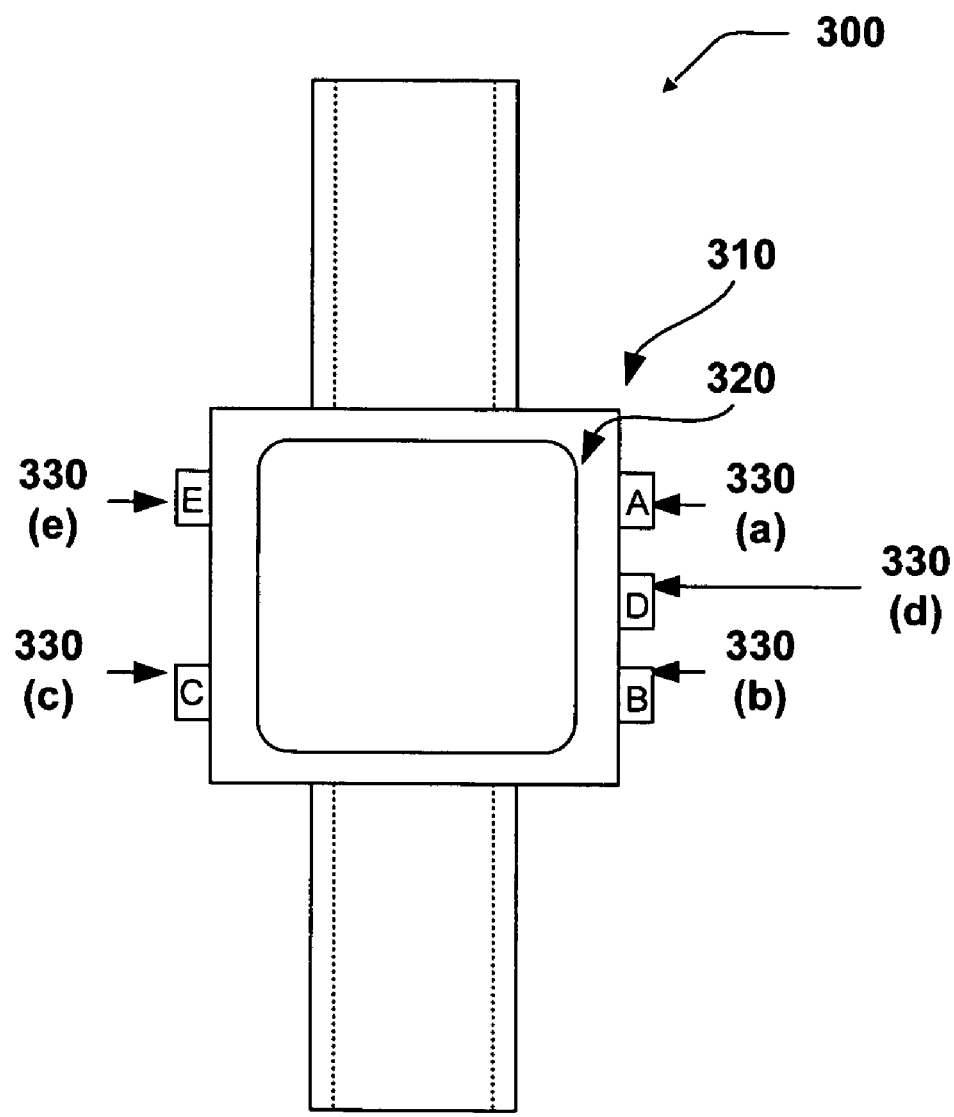
FIG. 3 illustrates an exemplary wearable embodiment of an electronic device in accordance with the present invention.

FIG. 3 illustrates an exemplary wearable device that includes an adaptive user interface that is configured to interact with content from other wireless devices, in accordance with aspects of the invention. Watch device 300 includes bezel 310 which has an electronic system. The electronic system performs the functions in a manner that is consistent with the hardware that is described with respect to FIG. 2. Bezel 310 includes display 320, such as a liquid crystal display, a multiple bit display, or a full color display. In one embodiment, watch hands are electronically generated on display 320 when the user is in a time mode. In an alternative embodiment, the bezel includes analog-type watch hands that do not detrimentally interfere with display 320. Display 320 is configured to display any content supplied by a wireless devices in communication with watch device 300.

Watch device 300 includes a series of selectors, such as buttons A-E (330a-e), which are arranged to operate as part of an adaptive user interface (UI). Each selector may have a default function and/or a context determined function. The wireless device that is currently in communication with watch device 300 determines the context for each selector. Alternatively, the currently active display may determine the context for each selector. For example, a display screen (e.g., a help screen) may be superimposed on the main display such that the display screen becomes the active context. Watch device 300 is context sensitive in that the function that is associated with each selector may change based on the selected channel or display screen.

As previously stated, the watch form-factor provides a user with a readily-accessible form-factor that provides immediate content and accessibility to control a wireless device. As the content provided from the wireless device is produced on display 320, the user may also be provided with a set of available interactions. These interactions may be initiated by pressing one or more the selectors 330a-e. For example, display 320 may be presenting caller ID information from a cell phone in the user's pocket. Selector 330a may be configured by the adaptive user interface to allow the user to send the call directly to voicemail, while selector 330b answers the call but places the user on hold until the user retrieves the cell phone from their pocket. The readily viewable nature of watch device 300 may be particularly useful in a business meeting where it is considered socially unacceptable to answer a cell phone, but perfectly acceptable to glance at one's watch and possibly step out of the meeting.

Watch device 300 is provided to show a possible example form-factor for the wearable device of the present invention. Other form-factors are available and the description of watch device herein should not be considered to limit the spirit or scope of the invention.

Figure 4:
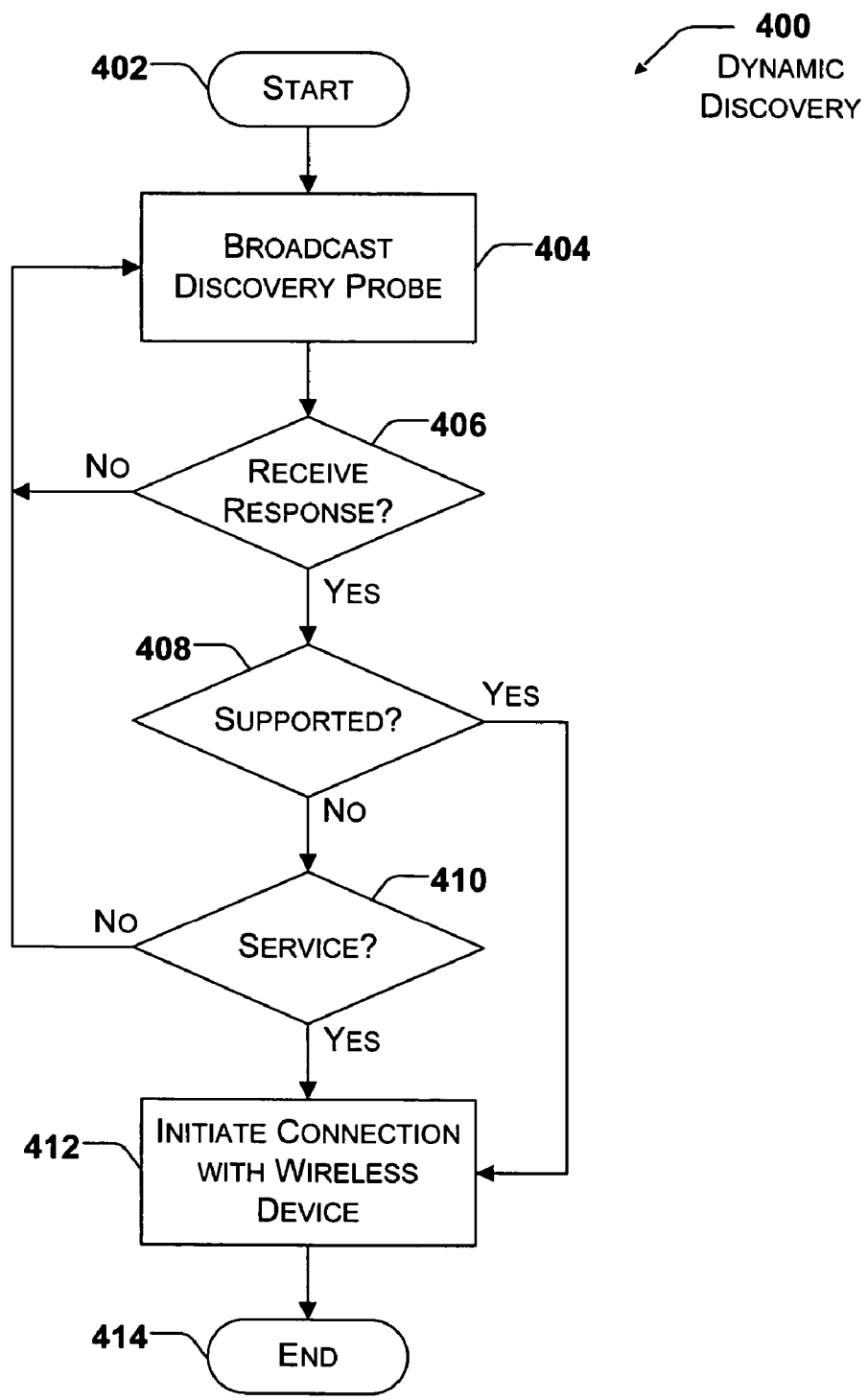
FIG. 4 illustrates a logical flow diagram for an exemplary process of dynamic discovery of wireless devices by a wearable device in accordance with the present invention.

FIG. 4 illustrates a logical flow diagram for an exemplary process of dynamic discovery of wireless devices by a wearable device in accordance with the present invention. Process 400 begins at block 402 where a user is in possession of a wearable device. Processing continues at block 402.

At block 402, the wearable device broadcasts a discovery probe to determine whether there are any wireless devices within an accepted proximity of the wearable device. An accepted proximity is dependent on the standard of communication available through the wearable device. For example, the wearable device may be enabled with BLUETOOTH communication technology as provided by the Microsoft Corporation of Redmond, Wash. If so, a wireless device within an accepted proximity of the wearable device is within the BLUETOOTH communication range. The discovery probe may contain information about the wearable device, such as an identifier or other information. Additionally, the probe may be limited to types of devices (e.g., find light switches, etc.). Once the discovery probe is sent, processing continues to decision block 406.

At decision block 406, a determination is made whether a response is received by the wearable device from any wireless devices. It may be that no wireless devices are within an accepted proximity of the wearable device. It also may be that wireless devices within the accepted proximity of the wearable device have been selected not to response to this particular wearable device. For example, two users may be in proximity with one another. The first user is wearing a wearable device, while the second user has a cell phone in their possession. The first user's wearable device sends out a discovery probe that the second user's cell phone receives. The second user's cell phone may examine the identifier of the first user' wearable device and reject the communication request as coming from an unaccepted source. Therefore, a wearable device may have wireless devices within an accepted proximity, but still receive no responses to its discovery probe. If no responses are received by the wearable devices, processing returns to block 404 where another discovery probe is sent. In one embodiment, a delay of a selected time interval (e.g., 1 minute) is made between each discovery probe to allow a user to change their environment such that wireless device may enter their proximity. If however, the wearable device does receive a response from a wireless device, processing continues at decision block 408.

At decision block 408, wearable device 408 examines the response received by the wireless device to determine whether the surfacing content from this particular wireless device is supported by the wearable device. In one embodiment, wireless devices expose a device identifier that corresponds to a hierarchical abstract (unique) description of a device. The device identifier is structured to allow fuzzy matching (e.g., a specific model of TV needn't be known, as long as all models by this manufacturer are compatible, etc.). In a further embodiment, the wireless device also exposes a device profile, which describes available services, policies, certificates, UI description, preferences, and other attributes of the wireless device. The format and content of device profile is arbitrary based on the device, but follows certain interaction rules for communication between wearable devices and wireless devices. In one embodiment, wearable device supplies an extensible library of UI elements and composition rules. It may be that the wireless device identified is already supported by the wearable device. If so, processing advances to block 412. However, if the wireless device identified is not currently supported by the wearable device, then processing continues to decision bock 410.

At decision block 410, a determination is made whether a service is available that allows the wearable device to obtain support for the wireless device. The service may be able to access the wireless device and generated a device profile that the wearable device can use. In another embodiment, the wearable device may be able to access a remote database that includes the device profile for the wireless device so that support may be downloaded to the wearable device. If no service is available, then the wearable device is unable to surface data or provide control of the wireless device and processing returns to block 404 so that other devices may be located. However, if a service is available, and support may be obtained for the wireless device, then processing continues to block 412.

At block 412, a communication connection is initiated between the wearable device and the wireless device. The initiated communication connection merely establishes that the devices may communicate with one another. Processes 500 and 600 of FIGS. 5 and 6 describe the process for setting up the surfacing of content and control features as well as the interaction between devices once control is provided to the wearable device. Once the communication connection is initiated, processing moves to block 414 where process 400 ends and the wearable device moves onto other processing.

In another embodiment, the wearable device may already be aware of a wireless device with which it may communication. For example, the user may have already set up the wearable device to communication with a particular wireless device. In such a case, the wearable device sends out a discovery probe that is pointed looking for the selected wireless devices. For example, a user may desire to establish communication between a cell phone and a watch device so that the watch device displays the cell phone caller ID information. The user may initiate the communication by setting up each device to respond to the other device's transmissions when normally each device would ignore such transmissions.

In still another embodiment, the user in possession of the wearable device is provided with a selection that allows the user to probe for wireless devices at any arbitrary time. It may be that the user has just entered a room and desires to have the user's wearable device communicate with any available wireless devices located in the room. At that time, the user is able to select to send out a discovery probe to determine if any wireless devices are available.

In a further embodiment, process 400 also includes steps for queuing and handling multiple wireless device response to a discovery probe. For example, an intermittent user interface screen may be displayed that lists each of the wireless devices available. The user is then able to select one of the listed wireless devices for initiating a communication connection. The user interface of the wearable device is then dynamically updated to correspond with content from the selected wireless device (see FIG. 5 below).

In still another embodiment, the communication protocol between the wearable device and the wireless devices may instead be configured so that it is the wireless devices emitting the discovery probes to locate wearable with which to communicate.

In yet a further embodiment, when a wireless device is not fully recognizable as a supported by the wearable device, the wearable device determines whether the wireless device belongs to a class of devices supported by the wearable device. For example, the wearable device may not support a particular cell phone but can still support the general phone features associated with the class to which that phone belongs.

Figure 5:
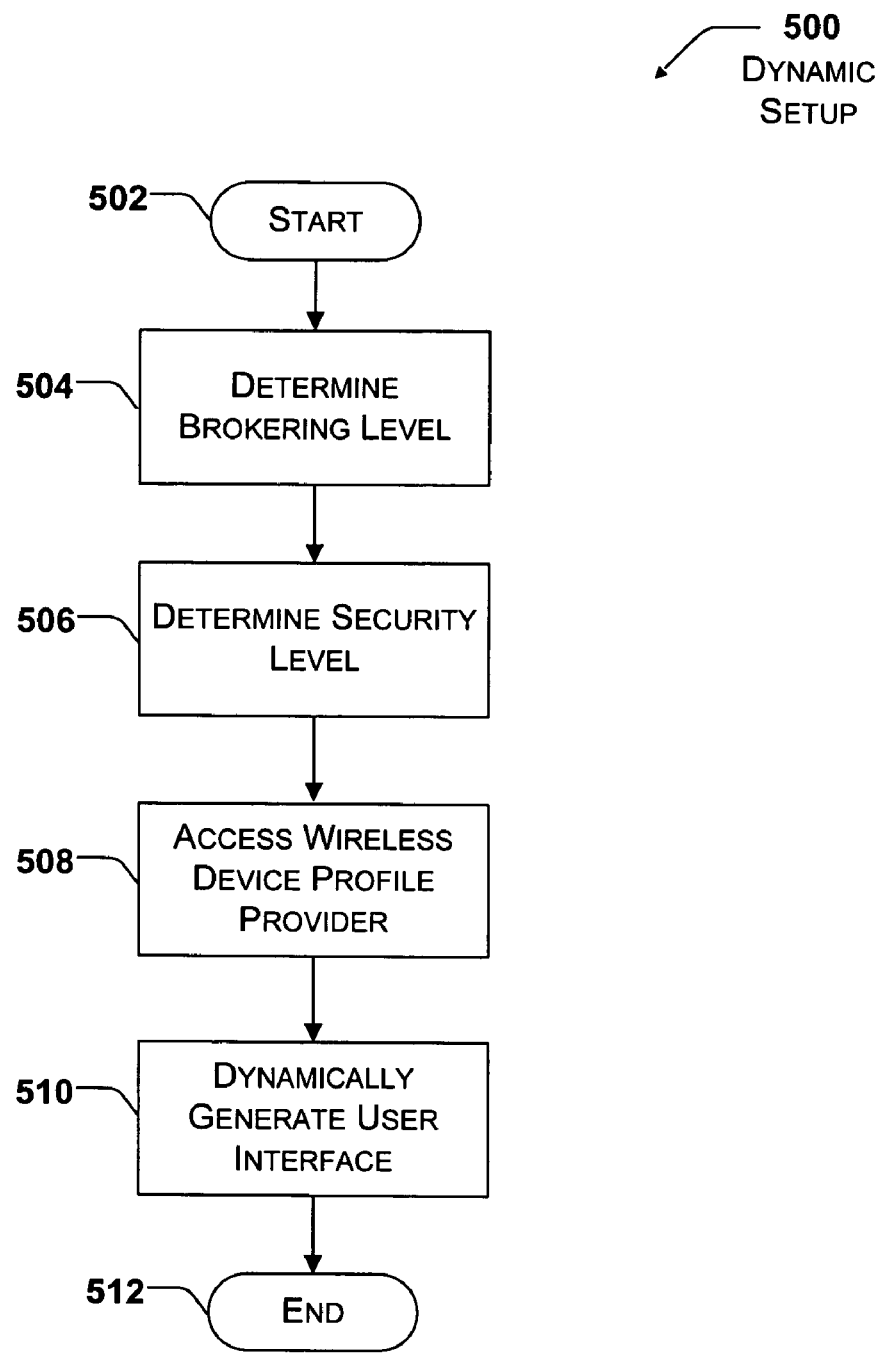
FIG. 5 illustrates a logical flow diagram for an exemplary process of dynamic setup of communication between wireless devices and a wearable device in accordance with the present invention.

FIG. 5 illustrates a logical flow diagram for an exemplary process of dynamic setup of communication between wireless devices and a wearable device in accordance with the present invention. Process 500 starts at block 502 where a communication connection has been initiated between a wearable device and a wireless device. Processing continues at block 504.

At block 504, the brokering level between the devices is determined. The brokering level is dependent on the relationship between the wearable device and the wireless device. For example, the wireless device may be public and can communication with all wearable devices (e.g., a trail marker on a ski slope or a signpost on a street corner). The wireless device and the wearable device may be owned by same person and therefore is accessible to the wearable device (e.g., a heart rate sensor). The wireless device is private owned by another user and therefore not immediately accessible by the wearable device (e.g., a friend's smart storage device). These various relationships have implications for how service is brokered through the use of policy. Brokering describes the circumstances under which services may be consumed. This process is policy-guided, with each policy specifying the stipulations. Some functionality can be qualified, such as the sampling frequency of the heart rate sensor. Specified parameters fall within allowable ranges, which may be based on service level or priority, or any other arbitrary condition. Once the brokering level for the wearable device and the wireless device is determined, processing continues at block 506.

At block 506, the security level for the communication connection is determined. Security is provided to prevent unauthorized use of services, which is also policy-guided. The security level defines permissions and permission sets that represent the right to access various services provided by the wireless device to the wearable device. Determining the security level involves determining the security the sets of permissions associated with groups of services (service groups). The security level dictates the user's permission level to run certain applications. Once the security level is determined, processing continues at block 508.

At block 508, depending the level of brokering and the level of security, the wearable device is granted access (restricted or unrestricted) to a profile provider of the wireless device. Through the profile provider, the wearable device is able to plug into events occurring on the wireless device and receive report of these events (e.g., an incoming call event). Once the access to the profile provider is obtained, processing continues to block 510.

At block 510, the user interface or display of the wearable device is dynamically generated. The user interface associated with the wearable device is adaptive and may be adjusted as necessary for each wireless device to which the wearable device communicates. Additionally, each wireless device may have more the one service that the wearable devices subscribe to for control and content. The adaptive user interface is configured to allow dynamically produce a user interface for each of these services. As previously stated, the wearable device provides an extensible library of UI elements and composition rules for generating each display. Once the user interface is dynamically generated, processing moves to block 512 where process 500 ends and the wearable device moves to other processing.

Figure 6:
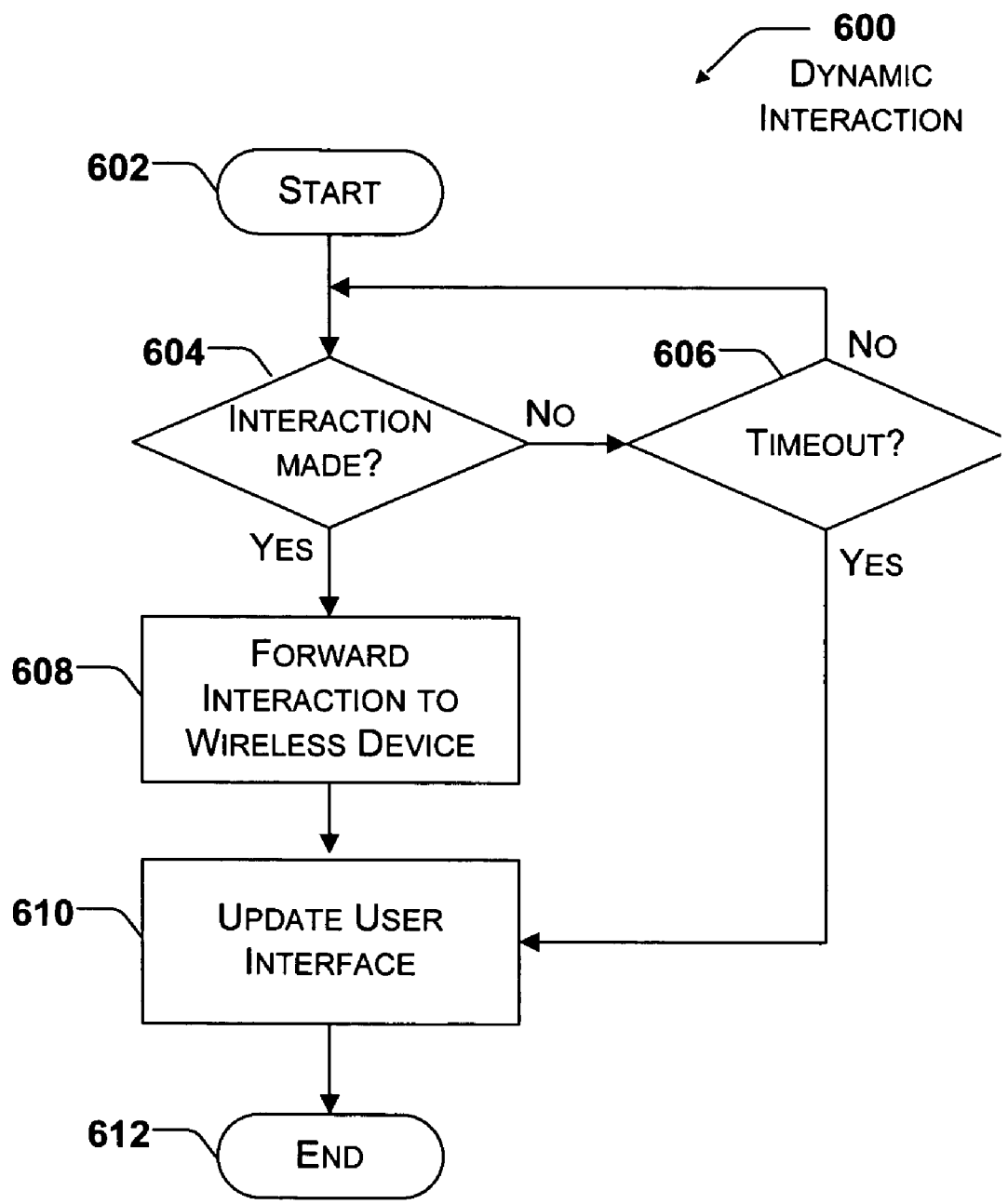
FIG. 6 illustrates a logical flow diagram for an exemplary process of dynamic interaction between wireless devices and a wearable device in accordance with the present invention.

FIG. 6 illustrates a logical flow diagram for an exemplary process of dynamic interaction between wireless devices and a wearable device in accordance with the present invention. Process 600 starts at block 602, where a user is presented with a dynamically generated user interface on the wearable device of content obtained from a wireless device. The dynamically generated user interface may be a result of an event on the wireless device (e.g., call received), or an established connection between devices (e.g., continually monitoring a heart rate). Processing continues at decision block 604.

At decision block a determination is made as to whether a user a selected an interaction with the wireless device from the wearable device. For example, when the user interface presented on a watch corresponds to an incoming call, the user may select to place the call on hold by pressing a selector button on the watch. If an interaction is made on the wearable device, processing advances to block 608. However, if not interaction is made, processing moves to decision block 606.

At decision block 606, a determination is made whether the event corresponding to the current user interface has timed out. For example, a time out may occur when the user does not interact with an incoming call and the call ends. A time out may also occur when the user has passed outside acceptable range to maintain communication between the wireless device and the wearable device. If a time out has not occurred, process returns to decision block 604 where the wearable device continues to present the current user interface and await an interaction by the user. However, if a time out has occurred, processing advances to block 610.

At block 608, when a user has selected an interaction with the wearable device, the interaction is forwarded to the wireless device for execution. For example, a user may select to turn off a light switch. The selection is communicated to the wireless light switch by the wearable device in possession of the user. Once the interaction is forwarded, processing continues at block 610.

At block 610, the user interface presented on the wearable device is updated to reflect the interaction by the user. For example, a user interface for a wireless light switch may read, "Light is ON. Turn OFF?". Once the user selects to turn off the light, the user interface changes, possibly to "Light is OFF. Turn ON?". Once the user interface is updated, processing continues to block 612 where process 600 ends, and the wearable device moves onto other processing.

As described above, the wireless devices and wearable devices may be operating in either an active announcement or passive listening mode for both discovery and interaction. A smart building, for instance, might have a secure door (powered) and operating in active announcement mode, periodically advertising its services (unlock). A heart rate sensor (battery powered), on the other hand, might sit idle awaiting discovery probes, such as might be caused by the user explicitly entering an application (on the wristwatch) that requires heart rate sensing services.

In a further embodiment of the present invention the wearable device may be configured to provide automated responses to a wireless device when event occur. For example, watch device in accordance with present invention may be set to "meeting mode" or have interacted with the user's calendar and determined the user is currently in a meeting. When a call comes into the user's phone and the call event is notified to the wearable device, the wearable device may provide an automated response, such as forward the call to voicemail or the like. Other responses may also be automated, such as automatically unlocking doors when they are encountered, or automatically starting a car. Through this automation and command, the present invention provides a central, easily accessible device for controlling any aspect of any wireless device within its proximity.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for controlling a wireless device using a wearable wristwatch device that provides bi-directional communication, the computer-implemented method comprising:
broadcasting a discovery probe from the wristwatch device, wherein the discovery probe includes an identifier that identifies information from the wristwatch device;
receiving, on the wristwatch device, at least one response from a wireless device, wherein the response includes a wireless device identifier and a profile of the wireless device, wherein the profile includes communication attributes of the wireless device;
determining whether a service is configured in the wristwatch device, wherein the service provides information for facilitating communication between the wristwatch device and the wireless device based on the received profile, wherein determining whether a service is configured in the wristwatch device to provide communication between the wristwatch device and the wireless device based on the received profile includes:
retrieving the service information from a storage library in the wristwatch device when the received profile matches a service in the storage library,
retrieving the service information from a database remote to the wristwatch device when the received profile does not match a service in the storage library;
initiating a communication connection between the wristwatch device and the wireless device based on the retrieved service information;

after initiating the communication connection between the wristwatch device and the wireless device, receiving a communication constraint policy on the wristwatch device related to the wireless device, wherein the policy includes a brokering level that indicates the public availability of data of the wireless device, wherein the policy includes a security level that indicates access rights for the wristwatch device to access applications of the wireless device;

accessing, from the wristwatch device, a profile provider of the wireless device based on the brokering level and security level of the received policy, wherein the profile provider provides a plug-in based on the brokering level and the security level for the wireless device in order to receive events occurring on the wireless device;

dynamically generating a user-interface on the wristwatch device for receiving the events occurring on the wireless device based on the plug-in provided by the profile provider, wherein user interface display elements of the user-interface are objected from an extensible library of user interface display elements in the wristwatch device;

receiving an event on the wristwatch device from the wireless device according to the plug-in provided by the profile provider;

selecting an action associated with the event on the wristwatch device; and forwarding the selected action from the wristwatch device for execution on the wireless device.

2. The computer-implemented method of claim 1, wherein selecting an action associated with the event includes receiving and indication that a hardware button of the wristwatch device has been engaged.

3. The computer-implemented method of claim 1, wherein the wireless device is a cellular telephone, wherein the received event is an incoming telephone call on the cellular telephone, wherein the action is a voicemail action, wherein selection of the voicemail action forwards the voicemail action to the cellular telephone to cause the incoming call to be sent to a voicemail of the cellular telephone.

4. The computer-implement method of claim 1, wherein the wireless device is a heart monitor.

5. The computer-implemented method of claim 1, wherein the discovery probe includes a device-type restraint which limits the probe to a device-type.

6. The computer-implemented method of claim 1, wherein determining whether the service is configured to provide communication between the wristwatch device and the wireless device based on the received profile includes a determination based on fuzzy matching.

7. The computer-implemented method of claim 1, wherein determining whether the service is configured to provide communication between the wristwatch device and the wireless device based on the received profile includes a determination based on a class of the wireless device.

8. The computer-implemented method of claim 1, wherein selecting an action associated with the event is automatic based on a preselected mode of the wristwatch device.

9. A computer readable storage medium having computer executable instructions for controlling a wireless device using a wearable wristwatch device that provides bi-directional communication, the instructions comprising:

broadcasting a discovery probe from the wristwatch device;

receiving, on the wristwatch device, at least one response from a wireless device, wherein the response includes a wireless device identifier that is associated with a profile of the wireless device;

determining a service configured to provide communication between the wristwatch device and the wireless device based on the received profile;

initiating a communication connection between the wristwatch device and the wireless device based on the service;

after initiating the communication connection between the wristwatch device and the wireless device, receiving a policy on the wristwatch device related to the wireless device, wherein the policy includes a security level that indicates access rights for the wristwatch device to access the wireless device;

accessing, from the wristwatch device, a profile provider of the wireless device based on the security level of the received policy, wherein the profile provider provides a plug-in based on the security level for the wireless device in order to receive events occurring on the wireless device;

generating a user-interface on the wristwatch device for receiving the events occurring on the wireless device based on the plug-in provided by the profile provider; and receiving an event on the wristwatch device from the wireless device according to the plug-in provided by the profile provider.

10. The computer-readable storage medium of claim 9, wherein the wireless device is a cellular telephone, wherein the received event is an incoming telephone call on the cellular telephone.

11. The computer-readable storage medium of claim 9, wherein the wireless device is a heart monitor.

12. The computer-readable storage medium of claim 9, wherein the discovery probe includes a device-type restraint which limits the probe to a device-type.

13. The computer-readable storage medium of claim 9, wherein determining the service configured to provide communication between the wristwatch device and the wireless device based on the received profile includes a determination based on fuzzy matching.

14. The computer-readable storage medium of claim 9, wherein determining the service configured to provide communication between the wristwatch device and the wireless device based on the received profile includes a determination based on a class of the wireless device.

15. A system for controlling a wireless device using a wearable wristwatch device that provides bi-directional communication, the system comprising:

a processor in the wristwatch device; and a memory in the wristwatch device having computer-executable instructions stored thereon, wherein the computer-executable instructions are configured for:

broadcasting a discovery probe from the wristwatch device;

receiving, on the wristwatch device, at least one response from a wireless device, wherein the response includes a wireless device identifier that is associated with a profile of the wireless device;

determining a service configured to provide communication between the wristwatch device and the wireless device based on the received profile;

initiating a communication connection between the wristwatch device and the wireless device based on the service;

after initiating the communication connection between the wristwatch device and the wireless device, receiving a policy on the wristwatch device related to the wireless device, wherein the policy includes a security level that indicates access rights for the wristwatch device to access the wireless device;

accessing, from the wristwatch device, a profile provider of the wireless device based on the security level of the received policy, wherein the profile provider provides a plug-in based on the security level for the wireless device in order to receive events occurring on the wireless device;

generating a user-interface on the wristwatch device for receiving the events occurring on the wireless device based on the plug-in provided by the profile provider; and receiving an event on the wristwatch device from the wireless device according to the plug-in provided by the profile provider.

16. The system of claim 15, wherein the wireless device is a cellular telephone, wherein the received event is an incoming telephone call on the cellular telephone.

17. The system of claim 15, wherein the wireless device is a heart monitor.

18. The system of claim 15, wherein the discovery probe includes a device-type restraint which limits the probe to a device-type.

19. The system of claim 15, wherein determining the service configured to provide communication between the wristwatch device and the wireless device based on the received profile includes a determination based on fuzzy matching.

20. The system of claim 15, wherein determining the service configured to provide communication between the wristwatch device and the wireless device based on the received profile includes a determination based on a class of the wireless device.

* * * * *